United States Patent [19]

Campbell

[11] 4,409,731
[45] Oct. 18, 1983

[54] FIXTURE FOR REMOVING AND REPLACING SHRUNK-ON SLEEVES ON A SHAFT

[75] Inventor: Ira J. Campbell, East Bradford, Pa.

[73] Assignee: Westinghouse Electric Corp., Pittsburgh, Pa.

[21] Appl. No.: 332,565

[22] Filed: Dec. 21, 1981

[51] Int. Cl.³ .............................................. B23P 19/00
[52] U.S. Cl. ........................................................ 29/800
[58] Field of Search .................... 29/447, 426.1, 426.3, 29/800; 219/10.49 R

[56] References Cited

U.S. PATENT DOCUMENTS

| | | | |
|---|---|---|---|
| 1,938,995 | 12/1933 | Beynon | 29/447 |
| 3,014,266 | 12/1961 | Samuels et al. | 29/447 |
| 3,560,709 | 2/1971 | Crane et al. | 29/447 |
| 3,724,059 | 4/1973 | Celdusky | 29/800 |
| 4,024,617 | 5/1977 | McCormick | 219/10.49 R |

*Primary Examiner*—Ervin M. Combs
*Assistant Examiner*—Steven E. Nichols
*Attorney, Agent, or Firm*—F. J. Baehr, Jr.

[57] ABSTRACT

A fixture for supporting a sleeve and induction coil which encircles the sleeve to facilitate removal and replacement of shrunk-on sleeves on a shaft, the fixture having upper and lower portions electrically insulated from each other and standoff insulated studs and pads which support the sleeve and induction coil within the fixture to minimize circulating currents in the fixture and heating of the fixture.

10 Claims, 5 Drawing Figures

FIXTURE FOR REMOVING AND REPLACING SHRUNK-ON SLEEVES ON A SHAFT

CROSS-REFERENCE TO RELATED APPLICATIONS

An application entitled "Method For Removing And Replacing Shrunk-On Sleeves On A Shaft" filed the same day as this application and assigned Ser. No. 332563, is closely related to this application and is hereby incorporated by reference into this application.

BACKGROUND OF THE INVENTION

This invention relates to shrunk-on sleeves on a shaft and more particularly to a fixture for removing and replacing sleeves shrunk-on a shaft.

In large rotating machines it is often desirable to install replaceable sleeves on a large shaft, because of the size of the shaft the sleeves are not pressed on the shaft, but are heated and allowed to cool on the shaft. This operation is normally referred to as heat shrinking, which produces an interference fit between the sleeve and the shaft to firmly attach the sleeve to the shaft. After the machine has been in operation, it may be necessary to remove the sleeves as they become damaged or to remove the sleeves in order to remove other portions of the machine from the shaft. Often the sleeves are destroyed or so badly distorted that new sleeves have to be installed.

SUMMARY OF THE INVENTION

In general, a fixture for removing and replacing shrunk-on sleeves on a shaft, when made in accordance with this invention, comprises a first plate having a U-shaped opening, which fits over the shaft without contacting the shaft, a second plate having a U-shaped opening which fits over the shaft without contacting the shaft, the first and second plates being electrically insulated from each other and fastened together to form an opening which fits over the shaft without contacting the shaft, and a plurality of studs electrically insulated from and fastened to the first and second plates. The studs are cooperatively associated to engage the sleeve and support the sleeve within the fixture. The fixture also supports a fluid cooled induction coil disposed to encircle the sleeve. A bracket is attached to one of the plates for moving and lifting the fixture and sleeve, whereby the sleeve can be induction heated and easily removed from and replaced in a shrunk-on fit on a shaft.

BRIEF DESCRIPTION OF THE DRAWINGS

The objects and advantages of this invention will become more apparent from reading the following detailed description in conjunction with the accompanying drawings, in which.

DESCRIPTION OF THE PREFERRED EMBODIMENT

Figure 1:
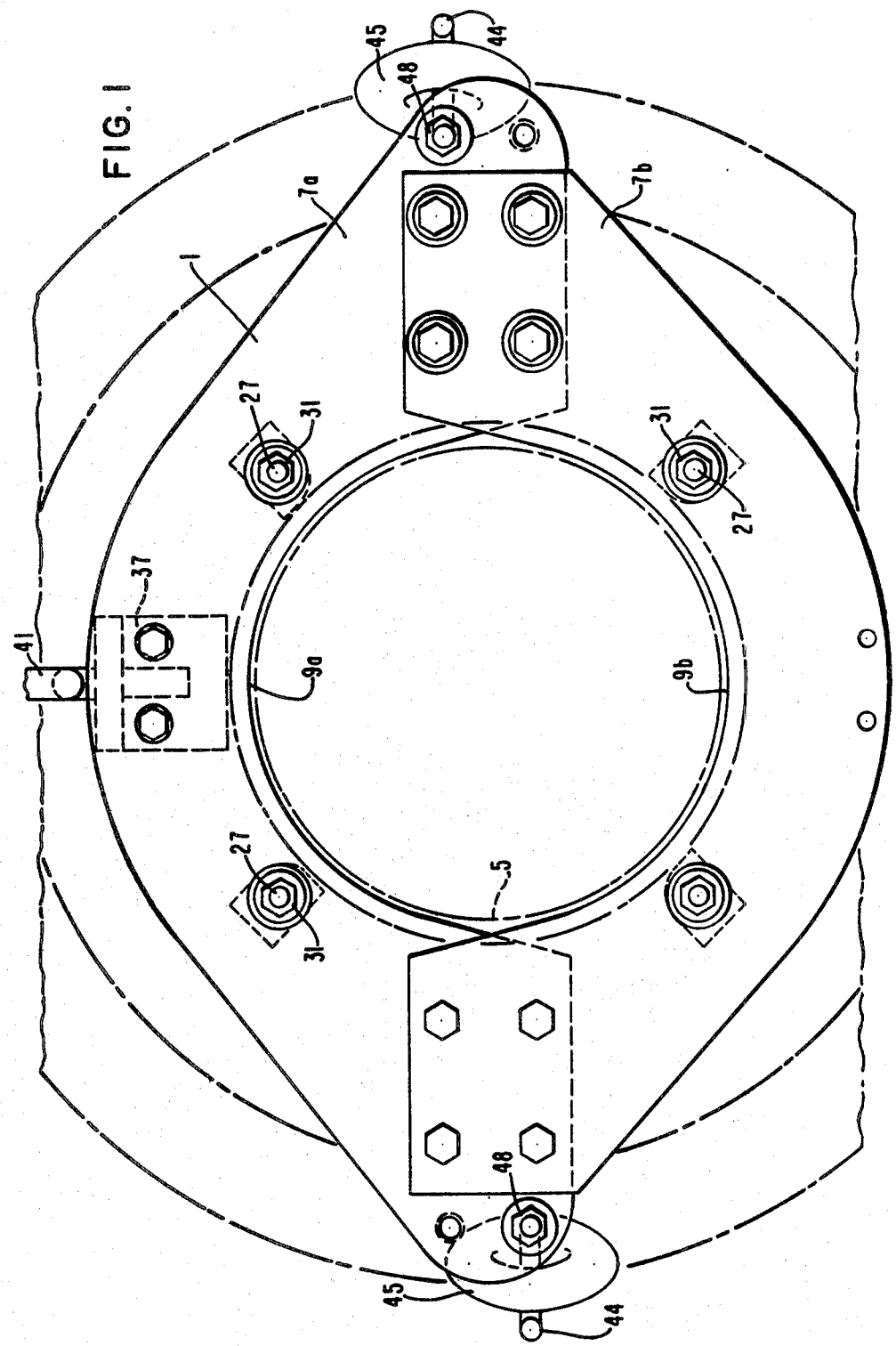
FIG. 1 is an elevational view of a fixture for removing and replacing a sleeve on a shaft showing a portion of the shaft and the sleeve.
Figure 2:
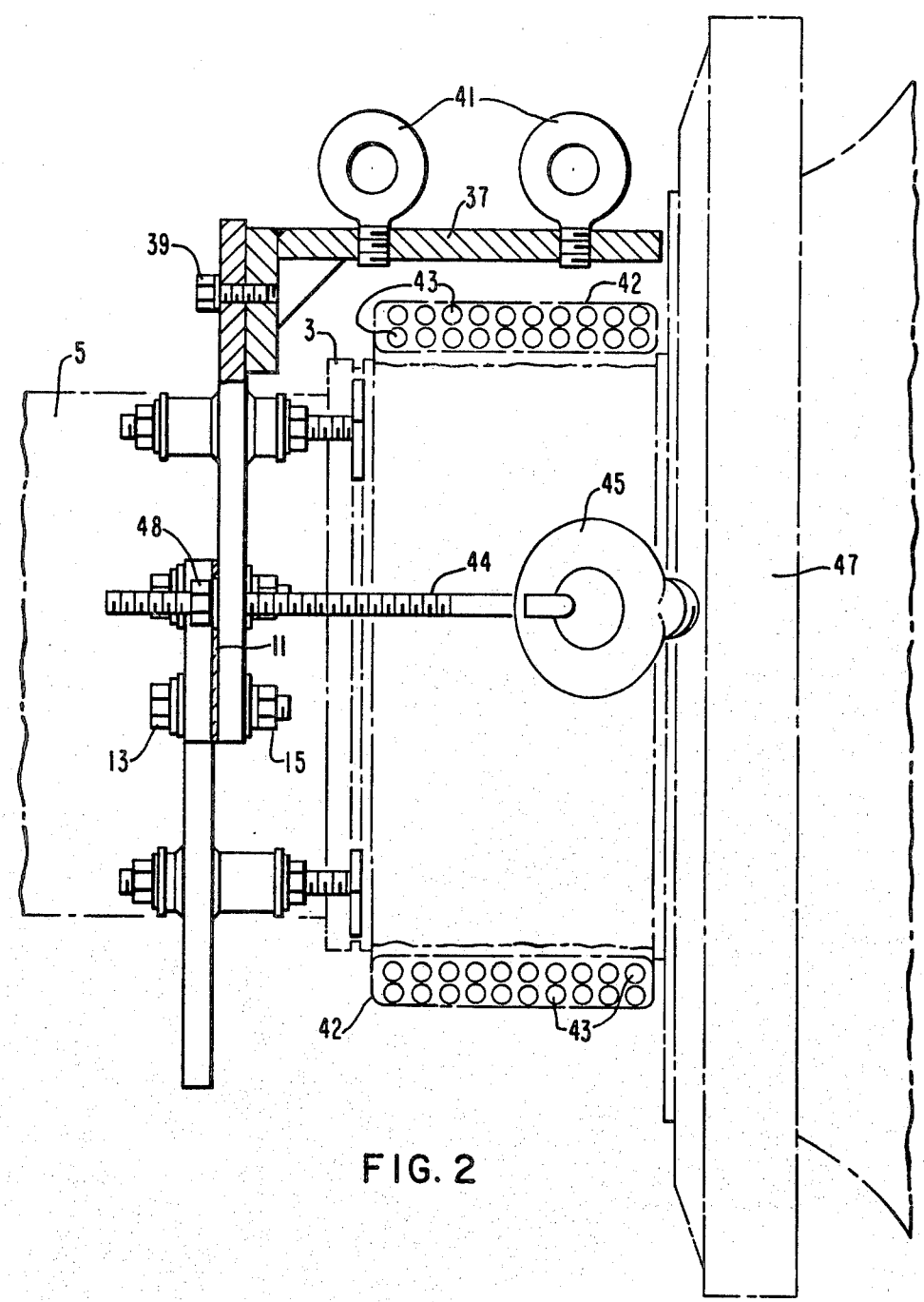
FIG. 2 is a sectional view taken on line II—II of FIG. 1.
Figure 3:
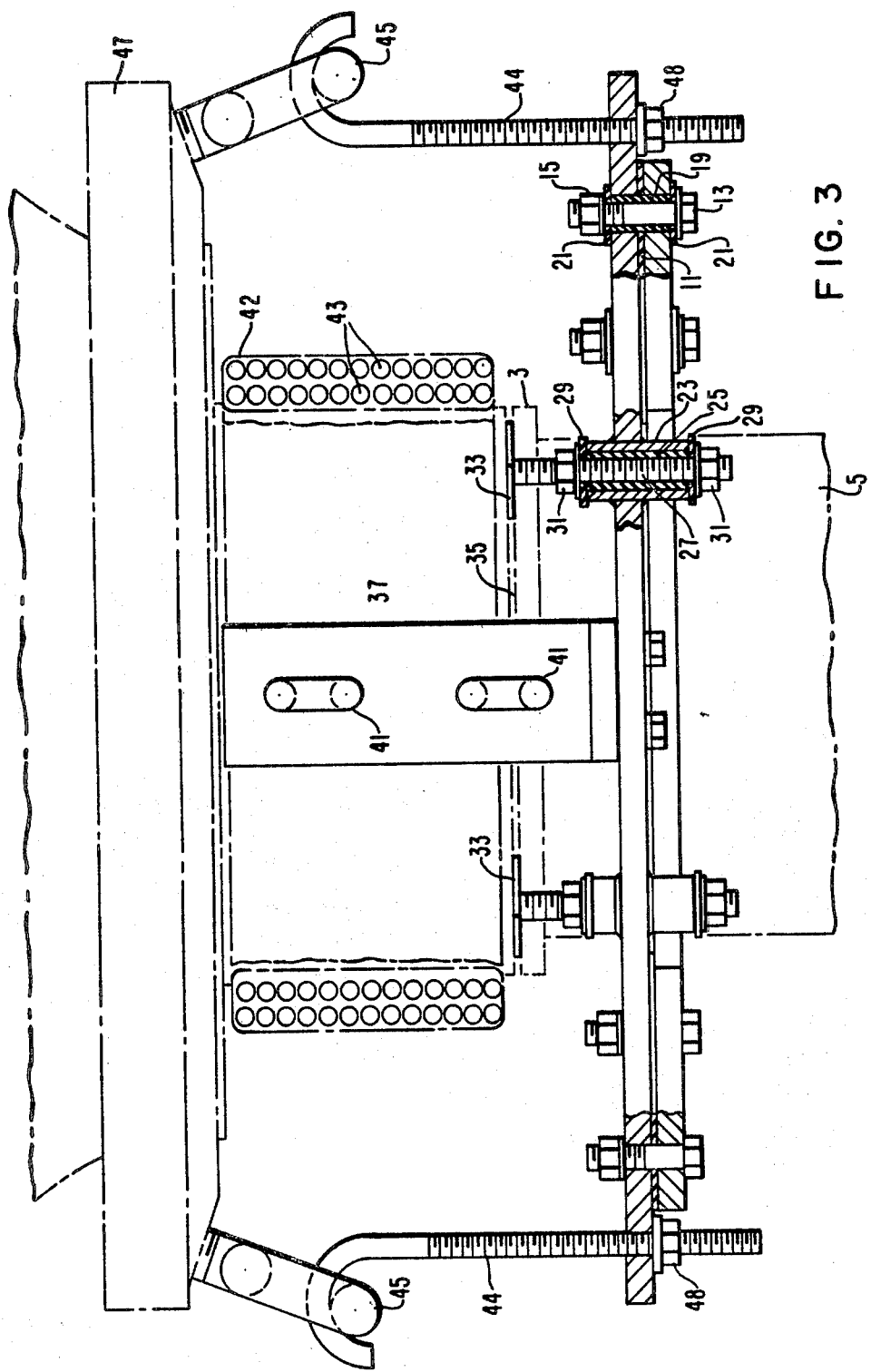
FIG. 3 is a sectional view taken on line III—III of FIG. 1.

Referring now to the drawings in detail and in particular to FIGS. 1, 2, and 3 there is shown a fixture 1 for removing and replacing sleeves 3 shrunk-on a shaft 5. The fixture 1 comprises a pluraliy of plate portions 7a and 7b each having a U-shaped opening 9a and 9b, respectively, which fits over the shaft 5 without contacting it. The plate portions 7a and 7b are electrically insulated or isolated from each other by a sheet of electrical insulating material 11 and fastened to each other by bolts and nuts 13 and 15 which pass through holes 17 in the plates 7a and 7b and have insulating bushings 19 and insulating washers 21 which cooperate to electrically isolate or insulate the plates 7a and 7b from each other so as not to form a circular electrical circuit and yet physically join the plates 7a and 7b to form a generally circular opening which fits over the shaft 5 without contacting it.

Sleeves 23 are welded to the plates 7a and 7b. Inside the sleeves 23 are insulated bushings 25 and studs 27 pass through the insulated bushings 25 and insulating washers 29 and nuts 31 position the studs 27 within the sleeves 23. On one end of the studs 27 is a pad 33 which is affixed thereto by welding or other means. The pads 33 fit a groove 35 in the sleeve and cooperate with the studs 27 to support the sleeve 3 within the fixture 1.

A bracket 37 is fastened to the plate portion 7a by machine screws 39 or other means and is disposed to extend over the studs 27 and sleeve 3. Eyelets 41 are fastened to the bracket 37 and are disposed so that the fixture 1 and sleeve 3 can be supported thereby on a crane or hoist (not shown).

A fluid cooled induction coil 42 formed of tubular conductors 43 encircles the sleeve 3 and with the sleeve 3 is supported by the fixture 1.

J-bolts 44 extend from the plate 7a and attached to eyelets 45 disposed on a balance ring 47 disposed on the shaft 5. Nuts 48 secure the J-bolts and fasten the fixture 1 and sleeve 3 at a particular location on the shaft 5 when the sleeve 3 is being reinstalled on the shaft 5.

Figure 4:
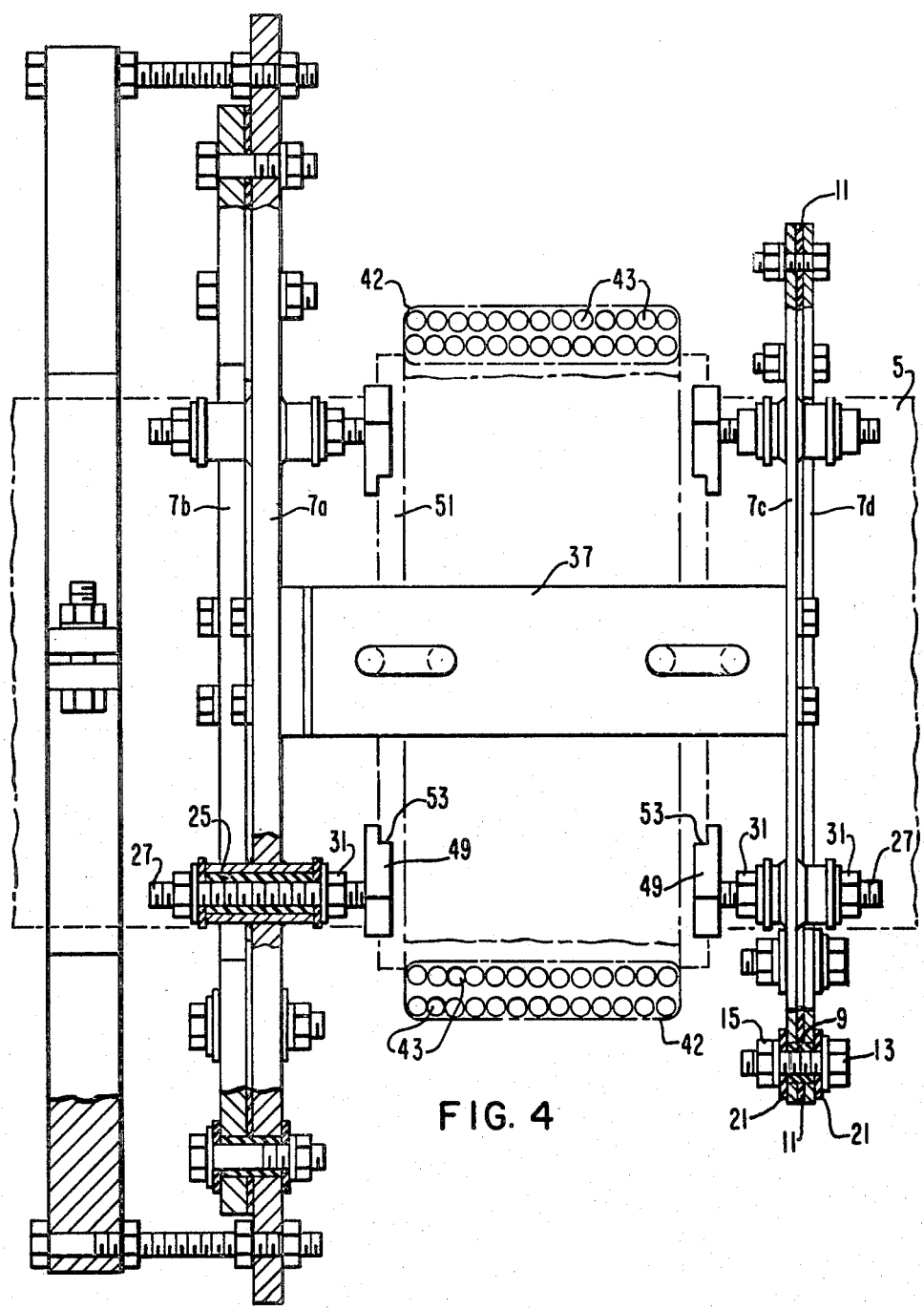
FIG. 4 is an elevational view partially in section of an alternative embodiment.
Figure 5:
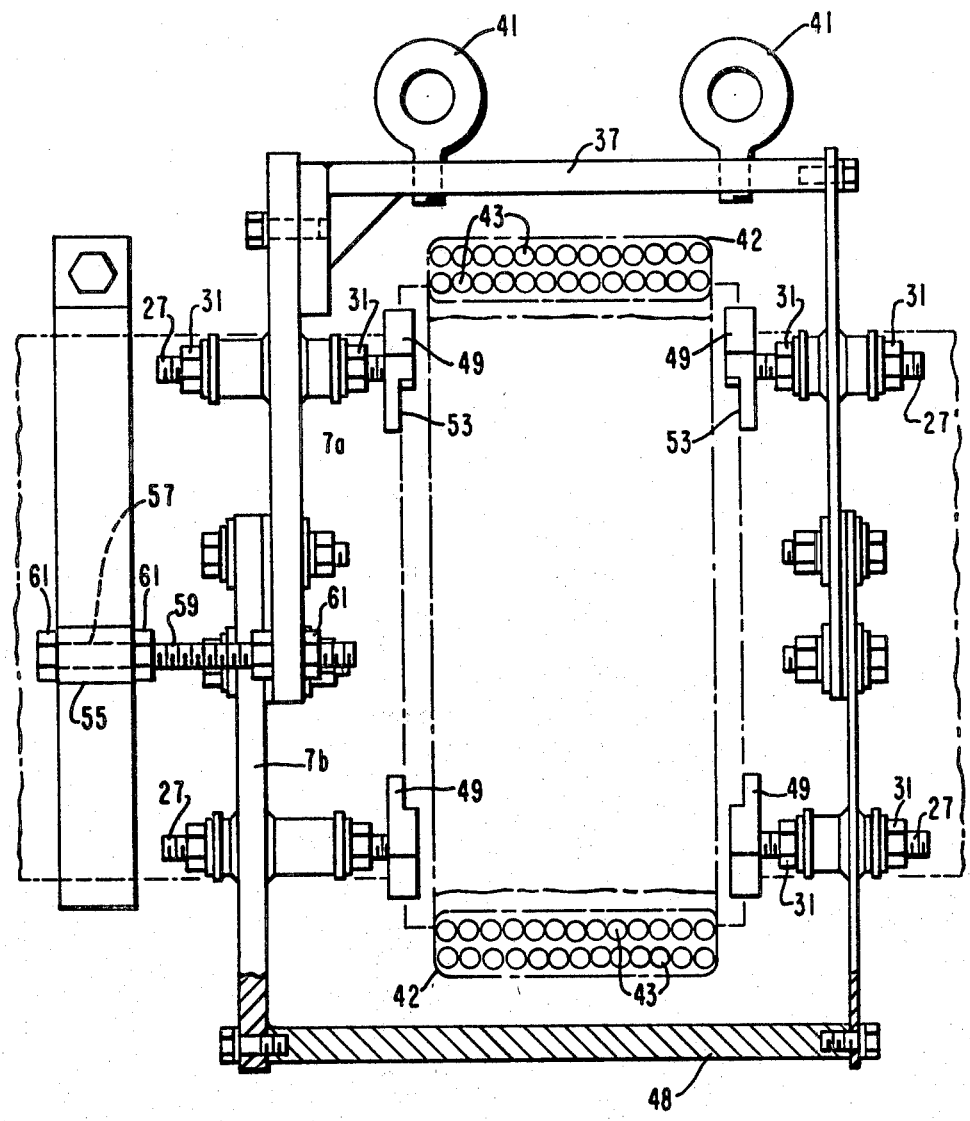
FIG. 5 is a sectional view taken on line V—V of FIG. 4.

As shown in FIGS. 4 and 5 a second set of plates 7c and 7d each have U-shaped openings 9c and 9d and are separated by an insulating sheet 11 and fastened together by bolts and nuts 13 and 15 passing through holes 17 in the plates 7c and 7d and have an insulating bushing 19 and insulating washers 21 which cooperate with the electrical insulating sheet 11 to electrically isolate or insulate the plates 7c and 7d so they do not form a conductive loop and yet physically join the plates 7c and 7d to form a generally round opening from the U-shaped openings 9c and 9d. The plate portion 7b is fastened to the bracket 37 and a support 48 connects the plates 7b and 7d.

Sleeves 23 disposed in the plate portions 7c and 7d have insulating bushings 25, studs 27, insulating washers 29 and nuts 31 associated therewith in order to position a pad 49 disposed on the end of the studs 27 to support a sleeve 51 within the fixture 1a. The pads 49 have a step 53 which engages the sleeve 51 and holds the sleeve 51 and induction coil 42 within the fixture 1a. A band 53 is clamped on the shaft 5 and has arms 55 which have holes 57 for receiving studs 59 which are utilized with nuts 61 to position the fixture 1a and sleeve 51 at a predetermined location on the shaft in order to locate the sleeve 51 at the particular location on the shaft as it cools.

The method of removing a sleeve 3 or 51 from a shaft 5 utilizing the fixture 1 or 1a, respectively, comprises the steps of:

matchmarking the sleeve 3 or 51 and the shaft 5 so that the sleeve 3 or 51 may be replaced in the exact orientation and location on the shaft 5;

placing the induction coil 42 over the sleeve 3 or 51;

attaching the fixture 1 or 1a to the sleeve 3 or 51, respectively, utilizing the studs 27 and pads 33 or 49 to support the sleeve 3 or 51 within the fixtures 1 or 1a;

passing cooling fluid through the induction coil heating the sleeve to a sufficient temperature, under 800° F., by applying an alternating current to the induction coil 42;

monitoring the temperature of the sleeve 3 or 51 utilizing thermocouples or other temperature monitoring devices to insure that the temperature does not exceed 800° F.;

attaching a crane or hoist to the fixture 1 or 1a to remove the fixture and sleeve when there is clearance between the sleeve and the shaft;

insulating the removed sleeve so that it cools slowly and evenly in order to prevent distortion to the sleeve.

The method for installing the sleeve 3 or 51 on the shaft 5 comprises the steps of:

placing an induction coil 42 over the sleeve;

attaching the fixture 1 or 1a to the sleeve 3 or 51, respectively, so that the sleeve 3 or 51 and induction coil 42 are supported by the fixture;

attaching a hoist or crane to the fixture 1 or 1a;

passing a cooling fluid through the induction coil;

heating the sleeve 3 or 51 by applying alternating current to the induction coil 42 until the temperature of the sleeve 3 or 51 reaches a predetermined temperature;

monitoring the temperature of the sleeve 3 or 51 utilizing thermocouples or other temperature monitoring devices;

sliding the sleeve 3 or 51 over the shaft 5 to the desired position aligning the matchmarks on the sleeve 3 or 51 and shaft 5;

clamping the sleeve 3 or 51 in place utilizing the J-bolts 44 or clamping band 53;

detaching the crane or hoist;

rotating the shaft 5 at a low speed, approximately 3 revolutions per minute unitl the sleeve 3 or 51 has cooled;

if the sleeve 3 is against a shoulder applying cooling air to the end of the sleeve 3 adjacent the shoulder to minimize the amount that the sleeve 3 pulls away from the shoulder;

removing the fixture 1 or 1a from the sleeve 3 or 51; and removing the induction coil 42 from the sleeve 3 or 51.

The fixtures and methods for removing and replacing shrunk-on sleeves on a shaft hereinbefore described advantageously allows for the removal of sleeves without cooling the shaft and due to the lower temperature at which the sleeve is removed distortion and damage to the sleeve is prevented making the sleeve reuseable, and by rotating the shaft when installing the sleeves shaft distortion due to lock-in stresses is reduced to an extent that post-sleeve installation stress relieving of the shaft is not required. It can be reused thus eliminating the use of new sleeves which necessitate machining in order to provide the required running tolerances.

What is claimed is:

1. A fixture for removing and replacing shrunk-on sleeves on a shaft, said fixture comprising:

a first portion having a U-shaped opening which fits over the shaft without contacting the shaft;

a second portion having a U-shaped opening which fits over the shaft without contacting the shaft;

the first and second portions being electrically insulated from each other so as not to allow circulating currents therethrough and fastened together to form an opening which fits over the shaft without contacting the shaft;

a plurality of studs electrically insulated from and fastened to the first and second portions;

the studs being cooperatively associated to engage the sleeve and support the sleeve in the fixture;

a fluid cooled induction coil disposed to encircle the sleeve;

a member attached to the first portion, the member having means for receiving leads for moving and lifting the fixture and sleeve, whereby the sleeve can be induction heated and easily removed and replaced in a shrunk-on fit on a shaft.

2. The fixture as set forth in claim 1 wherein the first and second portions are plates separated by insulation.

3. The fixture as set forth in claim 1 and further comprising third and fourth portions each having U-shaped openings, the third and fourth portions being electrically insulated from each other so as not to allow circular currents therethrough and fastened together to form an opening which fits over the shaft without contacting the shaft.

4. The fixture as set forth in claim 3, wherein the third and fourth portions are plates.

5. The fixture as set forth in claim 3, wherein the third and fourth portions are respectively connected to the first and second portions.

6. The fixture as set forth in claim 5, wherein each portion has two studs electrically insulated from and fastened thereto.

7. The fixture as set forth in claim 6, wherein each stud has a pad welded to one end thereof.

8. The fixture as set forth in claim 7, wherein each pad has a step adapted to engage the sleeve to support it in the fixture.

9. The fixture as set forth in claim 7, wherein each stud is adapted to engage the sleeve to support it in the fixture.

10. The fixture as set forth in claim 1 and further comprising a plurality of J-bolts which fit in holes in one of the portions and the shaft having eyelets attached thereto which the J-bolts engage to position the sleeve on the shaft.

* * * * *